(12) United States Patent
Glass et al.

(10) Patent No.: US 9,934,525 B2
(45) Date of Patent: *Apr. 3, 2018

(54) ONLINE PERSONALIZED GIFTING SYSTEM

(71) Applicant: Gift Card Impressions, LLC, Kansas City, MO (US)

(72) Inventors: Brett R. Glass, Kansas City, MO (US); Nicole E. Glass, Kansas City, MO (US)

(73) Assignee: Gift Card Impressions, LLC, Kansas City, MO (US)

( * ) Notice: Subject to any disclaimer, the term of this patent is extended or adjusted under 35 U.S.C. 154(b) by 178 days.

This patent is subject to a terminal disclaimer.

(21) Appl. No.: 14/682,405

(22) Filed: Apr. 9, 2015

(65) Prior Publication Data
US 2015/0213535 A1  Jul. 30, 2015

Related U.S. Application Data

(62) Division of application No. 13/273,220, filed on Oct. 13, 2011, now Pat. No. 9,031,869.

(60) Provisional application No. 61/392,993, filed on Oct. 14, 2010.

(51) Int. Cl.
| | |
|---|---|
| *G06Q 30/06* | (2012.01) |
| *G06F 3/0482* | (2013.01) |
| *G06F 3/0484* | (2013.01) |
| *G06F 17/30* | (2006.01) |
| *G06Q 30/02* | (2012.01) |

(52) U.S. Cl.
CPC ....... *G06Q 30/0621* (2013.01); *G06F 3/0482* (2013.01); *G06F 3/04842* (2013.01); *G06F 17/30274* (2013.01); *G06Q 30/0641* (2013.01); *G06Q 30/0207* (2013.01); *G06Q 30/06* (2013.01)

(58) Field of Classification Search
CPC ........... G06Q 30/06; G06Q 30/0601-30/0643
See application file for complete search history.

(56) References Cited

U.S. PATENT DOCUMENTS

| | | | |
|---|---|---|---|
| 9,031,869 B2* | 5/2015 | Glass | G06Q 30/0621 705/26.5 |
| 9,483,786 B2* | 11/2016 | Glass | G06Q 30/0621 |
| 2004/0205138 A1* | 10/2004 | Friedman | G06Q 30/02 709/206 |
| 2008/0189368 A1* | 8/2008 | Rothschild | B07C 3/00 709/205 |
| 2011/0145698 A1* | 6/2011 | Penov | G06F 17/272 715/235 |
| 2013/0132169 A1* | 5/2013 | Dooley | G06Q 30/00 705/14.1 |

OTHER PUBLICATIONS

5 Excellent ECard iPhone Apps. Amy-Mae Turner. Nov 13, 2010 (Year: 2010).*

* cited by examiner

*Primary Examiner* — William J Allen
(74) *Attorney, Agent, or Firm* — Erise IP, P.A.

(57) ABSTRACT

An online personalized gifting system for providing gift card related packaging formats to enhance the customer experience relating to online gift card sales.

20 Claims, 3 Drawing Sheets

Video Gift Card Holder Process Flow

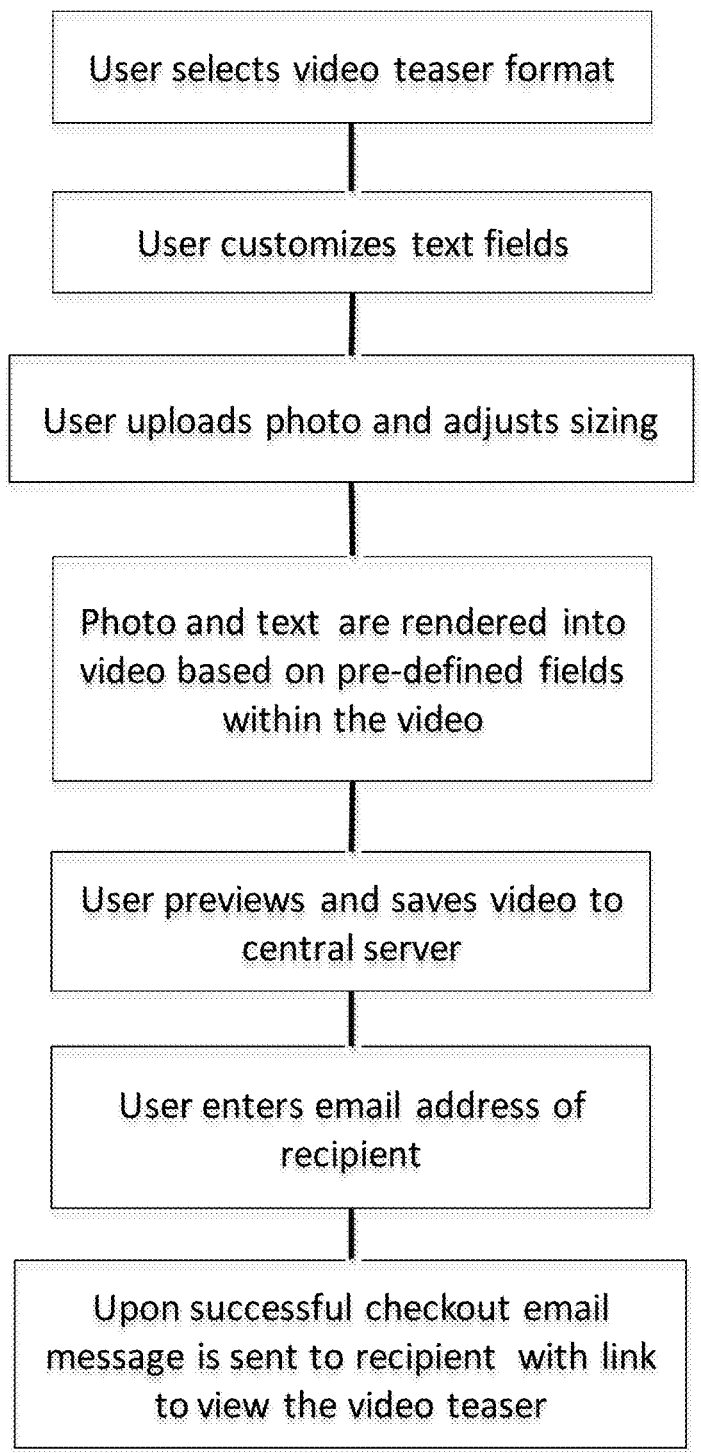

ONLINE PERSONALIZED GIFTING SYSTEM

CROSS REFERENCE TO RELATED APPLICATION

This application is a divisional application that claims the benefit of the prior filed, co-pending U.S. patent application Ser. No. 13/273,220 entitled "Method And System For Generating A Teaser Video Associated With A Personalized Gift," filed on Oct. 13, 2011, which claims priority to U.S. Provisional Application Ser. No. 61/392,933 entitled "Online Personalized Gifting System," which was filed on Oct. 13, 2010.

BACKGROUND OF THE INVENTION

This invention relates generally to gift cards and more particularly to a system for improving the overall giftability of gift cards by providing means for users to add numerous personalization options to physical gift card holders as well as the personalization of other digital communications mediums to communicate a sentiment, occasion, message, and/or gift card brand experience. A system according to the invention may include the creation and transmission of a personalized, introductory video to the intended gift card recipient prior to delivery and receipt of the physical gift card.

Transaction cards, stored value cards, or gift cards as they are commonly called based upon their intended use, have become popular gifts. Gift cards typically comprise a stored value card whereby a certain cash equivalent value is encoded upon a magnet strip applied to the surface of the card. This stored value may be determined by the vendor prior to packaging and display for sale or, more commonly, is selected at the point of sale by the purchaser and loaded by the cashier using a magnet card reader/writer.

Holders for gift cards have been used both to simply store gift cards and to provide a surface for decorative indicia and graphics, as well as personalized or preprinted text. Gift card holders that provide user initiated sound are also known, as disclosed in U.S. Pat. application Ser. No. 13/273,220. Needed is a system that provides for personalization of gift card holders via an online, interactive ordering platform, whereby a user may select from content provided by the system as well as upload personalized content for inclusion in the production of the holder and may personalize an introductory video for delivery to the gift recipient to enhance anticipation and excitement regarding the impending receipt of the holder and an accompanying gift card.

BRIEF DESCRIPTION OF THE INVENTION

The purpose of this invention is to provide a means for a user of the system, typically a gift giver, to personalize and customize a gift comprising a gift card. Among other functions and features, an online personalization system delivers a plurality of gift card related packaging formats intended to improve the giftability of online gift card sales. Three formats disclosed herein include:

1. A personalized, greeting card-style format that allows the user to upload a photograph, customize the greeting, customize a text message, and add sound such as music or a recorded voice message. Currently, these types of personalization options are offered primarily as it relates to social expressions, i.e. greeting cards, as opposed to gift cards.

2. A video card holder format that allows the user to upload their own personal video file which is then downloaded onto the video card holder via USB download, wireless radio signal, or other means, thus allowing the recipient to initiate playback upon receipt of the gift card and holder.

3. A video teaser comprising a video file (typically approximately 30-90 seconds in duration but which may be of any operable length) which can be personalized by uploading the gift card recipient's photo into the video as well as adding text content to certain customizable text fields, such as recipients name, occasion, or sentiment. The video teaser is provided to the recipient in some embodiments prior to their receipt of the gift card and can be provided via an email or QR code containing a link to a webpage where the video teaser may be viewed. The video teaser is provided in order to create excitement, anticipation, and imagination of the possibilities of a special gift arriving soon, thus extending the gifting experience to multiple days. Additionally the video teasers may be used to communicate a sentiment, occasion, and or gift card brand experience once the gift card has been received.

A method of generating a personalized gift card holder according to an embodiment of the invention may include the steps of providing a system and system interface, providing one or more gift card types, providing a user a choice of selecting one or more of the gift card types, providing one or more gift card holder designs, providing a user a choice of selecting one or more of the gift card holder designs, providing a user a choice of selecting a first sound file (such as a music recording) provided on the system or of uploading a second sound file (such as a voice message) to the system, providing a user means for uploading an image file (such as a photograph or logo or other graphic) to the system, providing a user means for uploading a video file to the system, providing a user means for submitting text to the system, transmitting user gift card, gift holder and sound file selections to a production facility, storing user-provided image files, text, and sound files on computer readable memory, attaching the memory to a card holder, attaching a transaction card to the card holder, providing a video relating to the gift card to the recipient, delivering the holder to a recipient.

Other advantages of the invention will become apparent from the following description taken in connection with the accompanying drawings, wherein is set forth by way of illustration and example an embodiment of the present invention.

BRIEF DESCRIPTION OF THE DRAWINGS

FIG. 3 is a chart showing steps of a Video Teaser Process Flow.

DETAILED DESCRIPTION

As required, a detailed embodiment of the present invention is disclosed herein; however, it is to be understood that the disclosed embodiment is merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
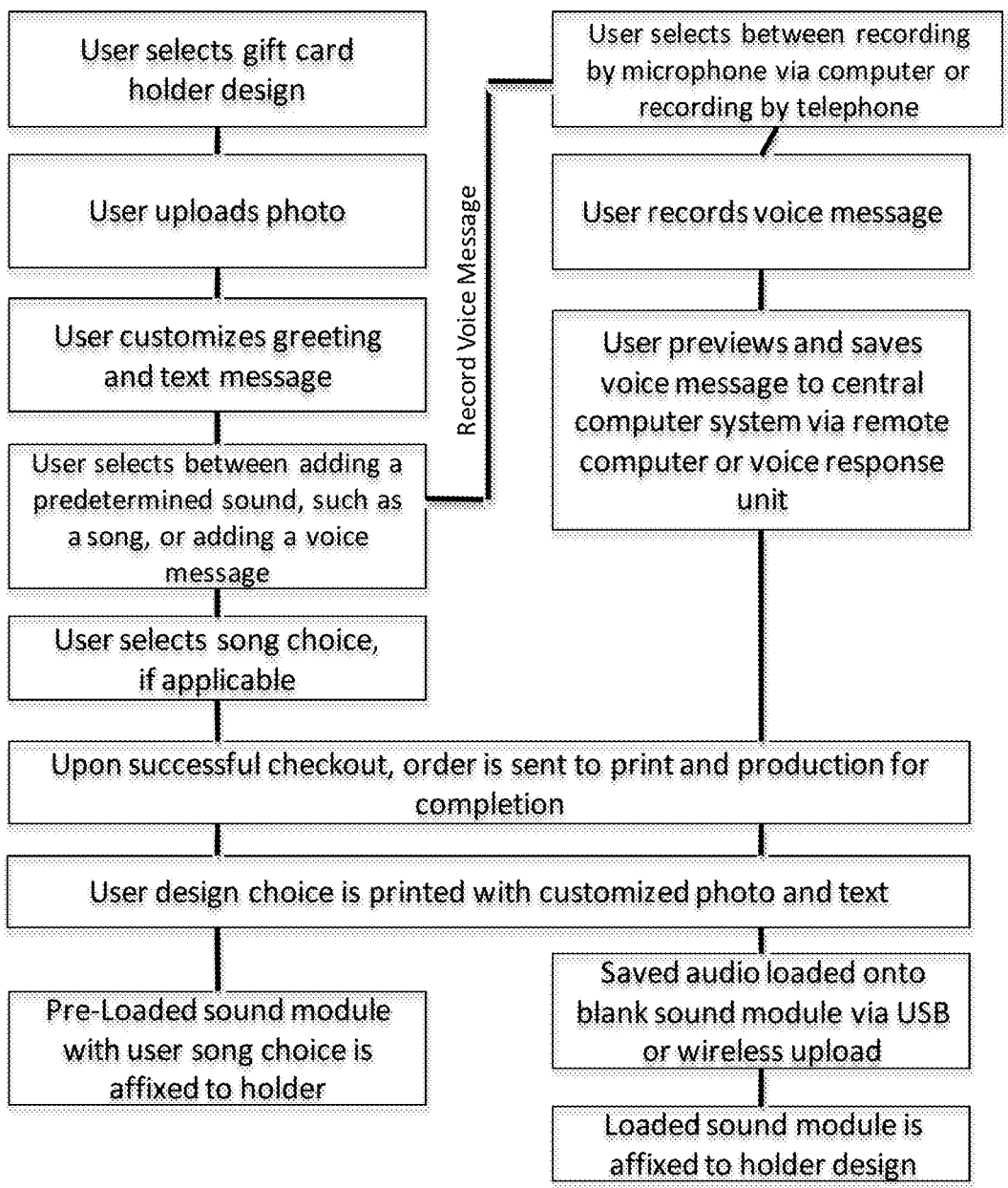
FIG. 1 is a chart showing steps of a Personalized Gift Card Holder Process Flow.
Figure 2:
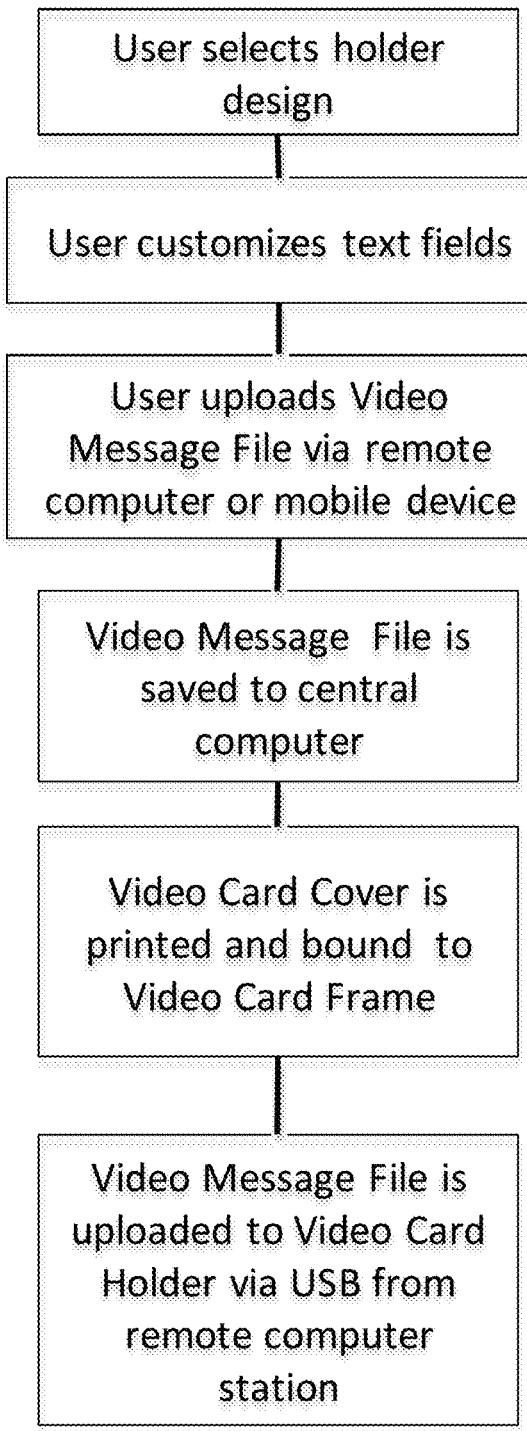
FIG. 2 is a chart showing steps of a Video Gift Card Holder Process Flow.

Referring now to FIGS. 1 through 3, there are shown embodiments of online personalized gifting platforms and gift packaging formats intended to improve the giftability of online gift card sales. Three formats include a system for providing a personalized gift card holder including, for example, a voice message, a video card holder including, for example, a personal video, and a personalized digital video teaser.

A gift card holder in accordance with a personalized greeting card format allows the user to upload a photo, customize a greeting, customize a text message, add pre-recording songs and/or record a sound or voice message. An online personalized gifting system including a gift card and gift card holder is typically accessed by the user via a user interface displayed on a personal computer (PC), smartphone, tablet or other personal computing device. The user interface, also referred to herein as the system interface, is typically a web page created using HTML, XML, XHTML, Javascript®, Java® or equivalent programming languages or scripts as generally known in the field. A user may arrive at the system interface via an html link provided on a third party website, such as a third party website offering gift cards or other goods or services, or by directly accessing a system provider website, or by mobile application via smart phone or tablet device.

The user typically initiates an online personalized gifting transaction by searching for specific gift cards via occasion, category (such as dining, spa, hotel, shopping, or event), brand, and/or recipient (such as him, her, teens, kids, babies) associated with gift cards. The user can also filter by geographic location, typically city and state, or zip code or by accessing the web-site directly. The user then selects a gift card corresponding to a particular offer. Typically, an offer will comprise a particular business entity or venue and may be, for example, a restaurant, hotel, theater, store, or shopping district. In some embodiments, the user may also select particular design graphics or indicia to appear on the gift card. The user then selects a gift card denomination or enters a desired denomination amount to load or associate with the gift card. In certain embodiments the user may search by experience and thus select multiple brands available via a single gift card (such as dinner and a movie) or a gift card that is pre-denominated.

Next, the user is presented an option to select from various gift card packaging options including but not limited to personalized and customized audio (not all options include audio, with some selections offered, the user selects a holder and customizes text and/or video) gift card holder, a pre-designed decorative gift card holder, a video gift card holder and a video teaser. With each of the packaging options the user is presented with the specific features and design previews in order make a choice.

After selecting a customizable audio gift card holder, the user is directed to a series of user interface web pages whereby various selections may be made and various items of personal information such as customizable greetings, sentiments, or occasions along with adding a personal message, photo, sound or voice message may be provided to the system for the system to use in creating the personalized and customized audio gift card holder. Initially, the user selects from among several gift card holder designs. Each design typically presents alternatives as to color choice, disposition of graphical elements and text upon the body of the holder and, in some cases, number and type of customizable elements.

As the user scrolls through design choices, text and icons on the web page indicate what each design offers as to appearance and functionality (e.g. upload photo or logo, enter text, select or record audio). In the present exemplary embodiment, the user interface indicates that the selected holder includes a designated area for printing a photo or logo provided by the user, one or more designated areas for printing personalized text provided by the user, and an audio circuit for playing sound.

The user follows a serious of instructions wherein the user is asked to select an existing sound file or to record their own message. In the case of an existing sound file, the user selects the desired song from among the choices presented by the system. If the user prefers to record their own message, they will be given the choice to record the message using the microphone on their computer or, they can record the message via a dial-in number where the user will be instructed via prompts how to record and save the message. The user will then be provided the opportunity to review the recorded message via the web-site before finalizing the selection. Once the selection of the sound file (pre-existing or provided by the user) is confirmed by the user, the sound file is sent to a computer located in a fulfillment center or, alternatively, the sound file may be sent to a computer storage facility that is connected via the Internet to a fulfillment center. That sound file is matched to the consumer's order and then burned on to an IC/OTP chip (via cable circuitry to the programmer or to the programmer via wireless connectivity). The IC/OTP chip is then placed in a sound module and then into the gift card holder that that user has selected. Chips may be burned one at a time or in multiple batches at a time.

After selecting the base gift card holder design, the user is provided with the opportunity to upload a photo. To initiate upload, a button or other link is typically selected by the user to access a local file directory showing a directory structure on the user's PC. The user selects the appropriate directory and then selects a photo image file on the PC for upload to the system. It should be appreciated that the user may thus access an image file physically stored on a hard drive or other storage media of the user's PC or may use the PC to access an external hard drive or server connected or in communication with the PC including image files accessed via Internet connect from a remote storage location. The photo file is typically accessed from a third party, external, social media or photo-sharing site (such as Facebook, Flickr, Snapfish, etc.) and is made available via API interface provided by such third party site where the photo files are located.

After the image file associated with the selected photo is uploaded to the system, the photo appears framed within a virtual image of a gift card holder on a system webpage or pop-up window so that the user may assess approximately how the photo will appear when printed on a gift card holder. Various controls are provided on the webpage to rotate the image and alter or adjust tone and size. Controls to move the image relative to the constraints of a display space provided on the gift card holder are also provided to allow the user to, for example, center a selected portion of the photo within the display space. A control to allow the user to crop the photo may also be provided.

After the user approves the photo and selected photo parameters or adjustments, typically by selecting a save or continue function, the system provides a web page or pop-up window for the user to select and enter a greeting and message that will each be printed and displayed upon the gift card holder. A drop down menu or equivalent function provides a list of pre-constructed greetings, each usually associated with particular holiday, event or sentiment. After selecting a greeting, the user may enter any desired text message within a text entry box. Instructions may be provided alerting the user to word or character limits. The interface may provide means for selecting text message font, size, and/or color, or these parameters may already be determined and may be pre-selected or determined according aspects of the selected card design such as color or theme. The system also provides an interface to for the user to upload a logo in designated areas.

If not already offered the opportunity to select and/or provide audio, as described above, the user next selects between adding prerecorded audio, such as a pre-recorded message or song, or recording a voice message or other audio using a computer microphone or telephone. If the user selects the option to add prerecorded audio, the user selects a song or other audio clip from a set of choices provided, typically via drop down menu. Alternatively, a menu of occasion themes may be provided such that the audio clip selection is determined and populated according to the selected theme.

If the user selects the option to record a message or other audio, the system provides an interface for receiving and recording a voice message or other audio signal provided by the user. The interface web page (typically a pop-up window, iFrame or similar web interface) may include a series of prompts or instructions that provide tips for best recording, a button or link to begin recording audio, a sliding bar or other indicator such as a counter that shows time elapsed or remaining until a recording time limit is exceeded, a preview or playback button or link to allow the user to listen to the recording, and a save or continue button or link to save the recording within the system.

The user may select among choices provided by the interface such as selecting between options to record by computer microphone or to record by telephone. If the option to record by computer microphone is selected, the user may record any sound, typically a voice message, using the computer microphone, and the recorded audio is uploaded to the provider server or other storage medium. Alternatively, the system may provide an option to upload a prerecorded audio file such as an audio file stored in mp3 or way format.

If the option to record by telephone is selected, the system provides a telephone number for the user to call to record any sound, typically a voice message, and the recorded audio is stored by the provider server.

After audio is recorded by the user using either method, the system provides an option to listen to the recording. The user may then approve the recording for use or rerecord another audio segment. Review of recorded audio may occur via the user computer or via telephone voice response unit. Once approved, the audio recording is saved as an mp3 file or other operable format (e.g. way).

The audio file may remain stored on the initial server or storage device utilized during audio recording by the provider or may be transferred to a production site server or storage device. As a further alternative, the recordation and storage of audio files may be handled by a third party service provider operating in cooperation with the system provider.

After the user completes the transaction, which typically includes providing payment information, the system generates an order corresponding to the user selections and the order is transmitted to a printing and production service for producing a gift card holder bearing personalized printing and including a personalized audio recording. The design selected by the user is printed on the holder along with any photograph or text provided or selected by the user. If a pre-recorded sound, such as a song, was selected by the user, a pre-recorded sound module having the selected sound recorded thereon is affixed to, or more typically within, the holder. If audio was recorded by the user it is loaded onto a blank sound module via USB or wireless file transfer, or other operable means, at a system production facility. The loaded sound module is then affixed to, or more typically within, the holder. A gift card or other transaction card is attached to or within the holder, or otherwise bundled with the holder, and the holder is conveyed to the recipient via US mail or other mail delivery service.

A gift card holder in accordance with a video gift card holder format allows the user to upload their own personal video file which is then downloaded onto the video card holder via USB or other operable means such as wireless radio signal (e.g. Wifi or Bluetooth) thus allowing the recipient to initiate playback upon receipt of the gift card held within the holder.

As an initial step, a user accesses the system interface and selects a holder design and, in certain embodiments, enters text in customizable fields. Next, the user may upload an image, such as a photograph, logo or other graphic. The user then selects whether to record a video segment using the user computer camera or to upload a video message file via remote computer or mobile device. The recorded video segment is stored in a video message file saved to a system server. The video gift card holder cover is printed and bound to the video gift card holder frame. The video message file is loaded to the video gift card holder video storage module via selected connection mode at a system production facility. A gift card is attached to or within the video gift card holder and the holder is conveyed to the recipient via US mail or other mail delivery service.

A video teaser is a video file which can be provided along with a gift card and gift card holder to communicate a particular sentiment, occasion, or gift card brand experience. The video teaser is typically personalized by uploading the gift card recipient's photo to a system central server. Text content can be added to certain customizable text fields such as recipients name, occasion, or sentiment. Upon the uploading of personalized content, the video is then rendered or composited to include the personalized content. The video teaser is sent ahead of the actual gift card, via email link to view the video, in order to create excitement, anticipation, and imagination of the possibilities of a special gift arriving soon, thus extending the gifting experience to multiple days.

Typically a user first selects a video teaser from among several prerecorded videos that may be viewed on or from a system interface. Next, the user uploads a photograph of the recipient, enters the recipient's name in a text box, selects an appropriate occasion or sentiment from among several provided by the system, and enters the recipients email address. Upon uploading the photograph, it may be edited as described above. In some embodiments, additional text fields may be provided to receive additional user text. The photograph and text are then rendered into the selected video based on pre-defined fields within the video thereby creating an augmented reality experience for the recipient. The user is provided with an option to preview the video and make changes to the user information. When the user is satisfied with the video it is saved to a central server. Upon completing the transaction via a payment/checkout procedure, an email message is sent to recipient with link to view the video.

The invention claimed is:

1. A method of generating a teaser video for gifting to a recipient, the method comprising:

providing, using instructions stored in at least one memory and executed by at least one processor, a user interface generated by a computing device, the user interface displaying one or more gifts;

receiving, using the instructions, selection of a gift from the one or more gifts from a user by the user interface;

receiving, using the instructions, user-supplied information that is associated with the selected gift, the user-supplied information comprising at least one of a photograph and user text information through the user interface;

compositing, using the instructions, a teaser video to include the user-supplied information by rendering the user-supplied information in one or more pre-defined fields of the teaser video, the user-supplied information indicating, to the recipient, that the selected gift is to be received at a future time; and transmitting, using the instructions, the composited teaser video to the recipient prior to the transmitting of the selected gift to the recipient.

2. The method of claim 1, wherein the selected gift comprises a gift card.

3. The method of claim 2, further comprising:

receiving, by the user interface, selection of a plurality of gift card holder designs, each gift card holder design comprising one or more customizable elements for entry of user-supplied content;

receiving, by the user interface, at least one of an image file and text information from the user, where the image file is stored in a data storage;

associating the user-provided image file or text information with the selected one gift card holder design, wherein the user provided image or text information comprises at least one of the customizable elements of the selected gift card holder design; and generating and transmitting an order by the computing device to a production facility, where the order comprises information associated with the gift card, the selected gift card holder design, the user-supplied image file or text information, and where the production facility assembles a gift card holder and delivers the gift card holder and the gift card associated with the gift card type to the recipient after the teaser video is transmitted to the recipient.

4. The method of claim 3, wherein the gift card is placed within the gift card holder.

5. The method of claim 1, wherein the image file comprises a photograph.

6. The method of claim 1, wherein the image file comprises a logo.

7. The method of claim 3, further comprising:

receiving, through the user interface, a sound file from the user, where the sound file comprises at least one of a voice message and a music recording; and associating the sound file provided by the user to the selected gift card holder design.

8. A system of generating a teaser video for gifting to a recipient, the system comprising:

a computing device comprising instructions stored in at least one memory and executed by at least one processor to:

provide a user interface generated by a computing device, the user interface displaying one or more gifts;

receive selection of a gift from the one or more gifts from a user by the user interface;

receive user-supplied information that is associated with the selected gift, the user-supplied information comprising at least one of a photograph and user text information through the user interface;

composite a teaser video to include the received user-supplied information by rendering the user-supplied information in one or more pre-defined fields of the teaser video, the user-supplied information indicating, to the recipient, that the selected gift is to be received at a future time; and transmit the composited teaser video to the recipient prior to the transmitting of the selected gift to the recipient.

9. The system of claim 8, wherein the selected gift comprises a gift card.

10. The system of claim 9, wherein the instructions are further executed to:

receive selection of one of a plurality of gift card holder designs, each gift card holder design comprising one or more customizable elements for entry of user-supplied content;

receive at least one of an image file and text information from the user, where the image file is stored in a data storage;

associate the user-provided image file or text information with the selected gift card holder design, wherein the user provided image or text information comprises at least one of the customizable elements of the selected gift card holder design; and generate and transmit an order by the computing device to a production facility, where the order comprises information associated with the gift card, the selected gift card holder design, the user-supplied image file or text information, and where the production facility assembles a gift card holder and delivers the gift card holder and a gift card associated with the gift card type to the recipient after the teaser video is transmitted to the recipient.

11. The system of claim 10, wherein the gift card is disposed within the gift card holder.

12. The system of claim 8, wherein the image file comprises a photograph.

13. The system of claim 8, wherein the image file comprises a logo.

14. The system of claim 10, wherein the instructions are further executed to:

receive a sound file from the user, where the sound file comprises at least one of a voice message and a music recording; and associate the sound file provided by the user to the selected one gift card holder design.

15. A non-transitory, computer readable medium storing code that when executed by at least one processor, is configured to perform at least the following:

providing a user interface generated by a computing device, the user interface displaying one or more gifts;

receiving selection of a gift from the one or more gifts from a user by the user interface;

receiving user-supplied information that is associated with the selected gift, the user-supplied information comprising at least one of a photograph and user text information through the user interface;

compositing a teaser video to include the received user-supplied information by rendering the user-supplied information in one or more pre-defined fields of the teaser video, the user-supplied information indicating, to the recipient, that the selected gift is to be received at a future time; and transmitting the composited teaser video to the recipient prior to the transmitting of the selected gift to the recipient.

16. The non-transitory, computer readable medium of claim 15, wherein the selected gift comprises a gift card.

17. The non-transitory, computer readable medium of claim 16, further configured to perform:
receiving, by the user interface, selection of one of a plurality of gift card holder designs, each gift card holder design comprising one or more customizable elements for entry of user-supplied content;
receiving, by the user interface, at least one of an image file and text information from the user, where the image file is stored in a data storage;
associating the user-provided image file or text information with the selected gift card holder design, wherein the user provided image or text information comprises at least one of the customizable elements of the selected gift card holder design; and
generating and transmitting an order by the computing device to a production facility, where the order comprises information associated with the gift card, the selected gift card holder design, the user-supplied image file or text information, and where the production facility assembles a gift card holder and delivers the gift card holder and a gift card associated with the gift card type to the recipient after the teaser video is transmitted to the recipient.

18. The non-transitory, computer readable medium of claim 17, wherein the gift card is placed within the gift card holder.

19. The non-transitory, computer readable medium of claim 15, wherein the image file comprises a photograph.

20. The non-transitory, computer readable medium of claim 17, wherein the code is further configured to perform:
receiving, by the user interface, a sound file from the user, where the sound file comprises at least one of a voice message and a music recording; and
associating the sound file provided by the user to the selected gift card holder design.

* * * * *